US008539210B2

(12) United States Patent
Julicher et al.

(10) Patent No.: US 8,539,210 B2
(45) Date of Patent: Sep. 17, 2013

(54) CONTEXT SWITCHING WITH AUTOMATIC SAVING OF SPECIAL FUNCTION REGISTERS MEMORY-MAPPED TO ALL BANKS

(75) Inventors: Joseph Julicher, Maricopa, AZ (US); Zacharias Marthinus Smit, Chandler, AZ (US); Sean Steedman, Phoenix, AZ (US); Vivien Delport, Chandler, AZ (US); Jerrold S. Zdenek, Maricopa, AZ (US); Ryan Scott Ellison, Chandler, AZ (US); Eric Schroeder, Pickerington, OH (US)

(73) Assignee: Microchip Technology Incorporated, Chandler, AZ (US)

( * ) Notice: Subject to any disclaimer, the term of this patent is extended or adjusted under 35 U.S.C. 154(b) by 526 days.

(21) Appl. No.: 12/147,746

(22) Filed: Jun. 27, 2008

(65) Prior Publication Data
US 2009/0144481 A1    Jun. 4, 2009

Related U.S. Application Data

(60) Provisional application No. 60/991,580, filed on Nov. 30, 2007.

(51) Int. Cl.
*G06F 9/48* (2006.01)

(52) U.S. Cl.
USPC ............................................. 712/228

(58) Field of Classification Search
USPC ............................................. 712/228
See application file for complete search history.

(56) References Cited

U.S. PATENT DOCUMENTS

| 5,034,887 | A | * | 7/1991 | Yasui et al. | 712/33 |
| 5,653,735 | A | | 8/1997 | Chen et al. | 607/9 |
| 5,956,520 | A | | 9/1999 | Kishi et al. | 395/800.39 |
| 5,987,258 | A | * | 11/1999 | Daniel et al. | 717/124 |

(Continued)

FOREIGN PATENT DOCUMENTS

| EP | 0889393 | 1/1999 |
| EP | 0913766 | 5/1999 |
| JP | 58112152 | 7/1983 |
| JP | 2001516922 A | 10/2001 |

OTHER PUBLICATIONS

International Search Report for PCT/US2008/084939, mailed Apr. 7, 2004, for applicant Microchip Technology Incorporated.
"PIC18F6525/6621/8525/8621 Data Sheet", Microchip Data Sheets (online), Jan. 14, 2005, XP002520509; URL: http://ww1.microchip.com/downloads/en/DeviceDoc/39612.pdf.

(Continued)

*Primary Examiner* — Keith Vicary
(74) *Attorney, Agent, or Firm* — King & Spalding L.L.P.

(57) ABSTRACT

A microcontroller device has a central processing unit (CPU); a data memory coupled with the CPU divided into a plurality of memory banks, a plurality of special function registers and general purpose registers which may be memory-mapped, wherein at least the following special function registers are memory-mapped to all memory banks: a status register, a bank select register, a plurality of indirect memory address registers, a working register, and a program counter high latch; and wherein upon occurrence of a context switch, the CPU is operable to automatically save the content of the status register, the bank select register, the plurality of indirect memory address registers, the working register, and the program counter high latch, and upon return from the context switch restores the content of the status register, the bank select register, the plurality of indirect memory address registers, the working register, and the program counter high latch.

16 Claims, 10 Drawing Sheets

(56) References Cited

U.S. PATENT DOCUMENTS

| | | | |
|---|---|---|---|
| 6,029,241 A * | 2/2000 | Wojewoda et al. | 712/38 |
| 6,055,211 A * | 4/2000 | Yach | 365/238.5 |
| 6,578,139 B1 | 6/2003 | Mitra et al. | 712/243 |
| 6,704,601 B1 | 3/2004 | Amely-Velez et al. | 607/59 |
| 6,708,268 B1 * | 3/2004 | Boles et al. | 712/220 |
| 6,735,664 B1 | 5/2004 | Keller | 711/5 |
| 2002/0032829 A1 | 3/2002 | Dalrymple | 711/5 |
| 2002/0059510 A1 | 5/2002 | Yoshimura | 712/34 |
| 2002/0184465 A1 | 12/2002 | Grosbach et al. | 711/202 |
| 2003/0056071 A1 | 3/2003 | Triece et al. | 711/165 |
| 2004/0177211 A1 * | 9/2004 | Boles et al. | 711/5 |

OTHER PUBLICATIONS

"PICmicro Mid-Range MCU Family Reference Manual", Microchip Reference Manuals (online), Oct. 15, 2004, XP002520508; URL: http://ww1.microchip.com/downloads/en/DeviceDoc/33023a.pdf.

International PCT Search Report and Written Opinion for Application No. PCT/US2008/084921, 13 pages.

International Preliminary Report on Patentability for Application No. PCT/US2008/084921, 7 pages.

First Office Action of the China State Intellectual Property Office, China Patent Application No. 200880116718.X, with English translation, 12 pages.

* cited by examiner

Bank Select register

Bank n

| Address | Name | Bit 7 | Bit 6 | Bit 5 | Bit 4 | Bit 3 | Bit 2 | Bit 1 | Bit 0 | Value on: POR, BOR | Value on all other resets |
|---|---|---|---|---|---|---|---|---|---|---|---|
| Bank n | | | | | | | | | | | |
| 000h | INDF0 | Addressing this location uses contents of FSR0H/FSR0L to address data memory (not a physical register) | | | | | | | | xxxx xxxx | xxxx xxxx |
| 001h | INDF1 | Addressing this location uses contents of FSR1H/FSR1L to address data memory (not a physical register) | | | | | | | | xxxx xxxx | xxxx xxxx |
| 002h | PCL | Program Counter (PC) Least Significant byte | | | | | | | | 0000 0000 | 0000 0000 |
| 003h | STATUS | IRP | RP1 | RP0 | TO | PD | Z | DC | C | 0001 1xxx | 0001 1xxx |
| 004h | FSR0L | Indirect Data Memory Address 0, LSB | | | | | | | | xxxx xxxx | xxxx xxxx |
| 005h | FSR0H | Indirect Data Memory Address 0, MSB | | | | | | | | xxxx xxxx | xxxx xxxx |
| 006h | FSR1L | Indirect Data Memory Address 1, LSB | | | | | | | | xxxx xxxx | xxxx xxxx |
| 007h | FSR1H | Indirect Data Memory Address 1, MSB | | | | | | | | xxxx xxxx | xxxx xxxx |
| 008h | BSR | — | — | — | BSR4 | BSR3 | BSR2 | BSR1 | BSR0 | ---0 0000 | ---0 0000 |
| 009h | WREG | WREG7 | WREG6 | WREG5 | WREG4 | WREG3 | WREG2 | WREG1 | WREG0 | xxxx xxxx | xxxx xxxx |
| 00Ah | PCLATH | — | Write Buffer for the upper 7 bits of the Program Counter | | | | | | | -000 0000 | -000 0000 |
| 00Bh | INTCON | GIE | PEIE | T0IE | INTE | RABIE | T0IF | INTF | RABIF | 0000 0000 | 0000 0000 |
| Legend: x = unknown, u = unchanged, q = value depends on condition, - = unimplemented, read as '0', r = reserved. Shaded locations are unimplemented, read as '0'. | | | | | | | | | | | |

Figure 12

| Mnemonic, Operands | | Description | Cycles | 14-Bit Opcode MSb         LSb | Status Affected | Notes |
|---|---|---|---|---|---|---|
| \multicolumn{7}{c}{BYTE-ORIENTED FILE REGISTER OPERATIONS} | | | | | | |
| ADDWF | f, d | Add WREG and f | 1 | 00 0111 dfff ffff | C, DC, Z | 1, 2 |
| ADDWFC | f, d | Add with Carry WREG and f | 1 | 11 1101 dfff ffff | C, DC, Z | 1, 2 |
| ANDWF | f, d | AND WREG with f | 1 | 00 0101 dfff ffff | Z | 1, 2 |
| ASRF | f, d | Arithmetic Right Shift | 1 | 11 0111 dfff ffff | C, Z | 1, 2 |
| LSLF | f, d | Logical Left Shift | 1 | 11 0101 dfff ffff | C, Z | 1, 2 |
| LSRF | f, d | Logical Right Shift | 1 | 11 0110 dfff ffff | C, Z | 1, 2 |
| CLRF | f | Clear f | 1 | 00 0001 1fff ffff | Z | 2 |
| CLRW | – | Clear WREG | 1 | 00 0001 0000 00xx | Z | |
| COMF | f, d | Complement f | 1 | 00 1001 dfff ffff | Z | 1, 2 |
| DECF | f, d | Decrement f | 1 | 00 0011 dfff ffff | Z | 1, 2 |
| INCF | f, d | Increment f | 1 | 00 1010 dfff ffff | Z | 1, 2 |
| IORWF | f, d | Inclusive OR WREG with f | 1 | 00 0100 dfff ffff | Z | 1, 2 |
| MOVF | f, d | Move f | 1 | 00 1000 dfff ffff | Z | 1, 2 |
| MOVWF | f | Move WREG to f | 1 | 00 0000 1fff ffff | | 1, 2 |
| RLF | f, d | Rotate Left f through Carry | 1 | 00 1101 dfff ffff | C | 1, 2 |
| RRF | f, d | Rotate Right f through Carry | 1 | 00 1100 dfff ffff | C | 1, 2 |
| SUBWF | f, d | Subtract WREG from f | 1 | 00 0010 dfff ffff | C, DC, Z | 1, 2 |
| SUBWFB | f, d | Subtract with Borrow WREG from f | 1 | 11 1011 dfff ffff | C, DC, Z | 1, 2 |
| SWAPF | f, d | Swap nibbles in f | 1 | 00 1110 dfff ffff | | 1, 2 |
| XORWF | f, d | Exclusive OR WREG with f | 1 | 00 0110 dfff ffff | Z | 1, 2 |
| \multicolumn{7}{c}{BYTE ORIENTED SKIP OPERATIONS} | | | | | | |
| DECFSZ | f, d | Decrement f, Skip if 0 | 1(2) | 00 1011 dfff ffff | | 1, 2, 3 |
| INCFSZ | f, d | Increment f, Skip if 0 | 1(2) | 00 1111 dfff ffff | | 1, 2, 3 |
| \multicolumn{7}{c}{BIT-ORIENTED FILE REGISTER OPERATIONS} | | | | | | |
| BCF | f, b | Bit Clear f | 1 | 01 10bb bfff ffff | | 1, 2 |
| BSF | f, b | Bit Set f | 1 | 01 11bb bfff ffff | | 1, 2 |
| \multicolumn{7}{c}{BIT-ORIENTED SKIP OPERATIONS} | | | | | | |
| BTFSC | f, b | Bit Test f, Skip if Clear | 1 (2) | 01 10bb bfff ffff | | 3 |
| BTFSS | f, b | Bit Test f, Skip if Set | 1 (2) | 01 11bb bfff ffff | | 3 |
| \multicolumn{7}{c}{LITERAL OPERATIONS} | | | | | | |
| ADDLW | k | Add literal and WREG | 1 | 11 1110 kkkk kkkk | C, DC, Z | |
| ANDLW | k | AND literal with WREG | 1 | 11 1001 kkkk kkkk | Z | |
| IORLW | k | Inclusive OR literal with WREG | 1 | 11 1000 kkkk kkkk | Z | |
| MOVLB | k | Move literal to BSR | 1 | 00 0000 001k kkkk | | |
| MOVLP | k | Move literal to PCLATH | 1 | 11 0001 1kkk kkkk | | |
| MOVLW | k | Move literal to WREG | 1 | 11 0000 kkkk kkkk | | |
| SUBLW | k | Subtract WREG from literal | 1 | 11 1100 kkkk kkkk | C, DC, Z | |
| XORLW | k | Exclusive OR literal with WREG | 1 | 11 1010 kkkk kkkk | Z | |

Note 1: When an I/O register is modified as a function of itself (e.g., MOVF GPIO, 1), the value used will be that value present on the pins themselves. For example, if the data latch is '1' for a pin configured as input and is driven low by an external device, the data will be written back with a '0'.

2: If this instruction is executed on the TMR0 register (and where applicable, d = 1), the prescaler will be cleared if assigned to the Timer0 module.

3: If the Program Counter (PC) is modified, or a conditional test is true, the instruction requires two cycles. The second cycle is executed as a NOP.

Figure 13A

| Mnemonic, Operands | | Description | Cycles | 14-Bit Opcode | | | | Status Affected | Notes |
|---|---|---|---|---|---|---|---|---|---|
| | | | | MSb | | | LSb | | |
| CONTROL OPERATIONS | | | | | | | | | |
| BRA | k | Relative Branch | 2 | 11 | 001k | kkkk | kkkk | | |
| BRW | – | Relative Branch with WREG | 2 | 00 | 0000 | 0110 | 0000 | | |
| CALL | k | Call Subroutine | 2 | 10 | 0kkk | kkkk | kkkk | | |
| CALLW | – | Call Subrouting with WREG | 2 | 00 | 0000 | 0000 | 1010 | | |
| GOTO | k | Go to address | 2 | 10 | 1kkk | kkkk | kkkk | | |
| RETFIE | k | Return from Interrupt | 2 | 00 | 0000 | 0000 | 1001 | | |
| RETLW | k | Return with literal in WREG | 2 | 11 | 0100 | kkkk | kkkk | | |
| RETURN | – | Return from Subroutine | 2 | 00 | 0000 | 0000 | 1000 | | |
| INHERENT OPERATIONS | | | | | | | | | |
| CLRWDT | – | Clear Watchdog Timer | 1 | 00 | 0000 | 0110 | 0100 | $\overline{TO}, \overline{PD}$ | |
| NOP | – | No Operation | 1 | 00 | 0000 | 0000 | 0000 | | |
| RESET | – | Software device Reset | 1 | 00 | 0000 | 0110 | 0001 | | |
| SLEEP | – | Go Into Standby mode | 1 | 00 | 0000 | 0110 | 0011 | $\overline{TO}, \overline{PD}$ | |
| C-COMPILER OPTIMIZED | | | | | | | | | |
| ADDFSR | n, k | Add Literal to FSRn | 1 | 11 | 0001 | 0nkk | kkkk | | |
| MOVIW | | Move INDFn to WREG, with pre/post inc/dec | 1 | 00 | 0000 | 0001 | 0nmm | Z | |
| | | Move INDFn to WREG, Indexed Indirect. | 1 | 11 | 1111 | 0nkk | kkkk | Z | |
| MOVWI | | Move WREG to INDFn, with pre/post inc/dec | 1 | 00 | 0000 | 0001 | 1nmm | | |
| | | Move WREG to INDFn, Indexed Indirect. | 1 | 11 | 1111 | 1nkk | kkkk | | |

Note 1: When an I/O register is modified as a function of itself (e.g., MOVF GPIO, 1), the value used will be that value present on the pins themselves. For example, if the data latch is '1' for a pin configured as input and is driven low by an external device, the data will be written back with a '0'.

2: If this instruction is executed on the TMR0 register (and where applicable, d = 1), the prescaler will be cleared if assigned to the Timer0 module.

3: If the Program Counter (PC) is modified, or a conditional test is true, the instruction requires two cycles. The second cycle is executed as a NOP.

Figure 13B

CONTEXT SWITCHING WITH AUTOMATIC SAVING OF SPECIAL FUNCTION REGISTERS MEMORY-MAPPED TO ALL BANKS

RELATED PATENT APPLICATION

This application claims the benefit of U.S. Provisional Application No. 60/991,580 filed Nov. 30, 2007, the contents of which are incorporated herewith.

TECHNICAL FIELD

The technical field of the present application relates to microprocessors or microcontrollers.

BACKGROUND

Microcontrollers generally constitute a system on a chip and comprise a microprocessor and a plurality of peripheral components. A wide variety of such microcontrollers exist having 8-bit, 16-bit and 32-bit architectures. Existing microcontrollers such as 8-bit microcontrollers manufactured by Microchip Technology Inc. provide for a flexible architecture. Such microcontrollers comprise a Harvard architecture in which program and data memories are separated. Microcontrollers of this type further comprise a specific banking system that allows access to the data memory. Generally, the data memory is divided in a plurality of banks and a bank select register defines which of the banks is currently selected and accessible. To access other banks, the bank select register has to be re-programmed. Even though a banking scheme, thus, only allows access to a defined memory bank, these controllers include instructions that force a switch to a pre-defined bank. This provides for improved and powerful performance despite the general access limitations.

However, there exists still bottlenecks in accessing the memory. Hence, there exists a need for an improved microcontroller architecture.

SUMMARY

According to an embodiment a microprocessor or microcontroller device may comprise a central processing unit (CPU); a data memory coupled with the CPU, wherein the data memory is divided into a plurality of memory banks; and a plurality of special function registers and general purpose registers which may be memory-mapped to the data memory, wherein at least the following special function registers are memory-mapped to all memory banks: a status register, a bank select register, a plurality of indirect memory address registers, a working register, and a program counter high latch; wherein upon occurrence of a context switch, the CPU is operable to automatically save the content of the status register, the bank select register, the plurality of indirect memory address registers, the working register, and the program counter high latch, and upon return from the context switch restores the content of the status register, the bank select register, the plurality of indirect memory address registers, the working register, and the program counter high latch.

According to a further embodiment, the device may further comprise an interrupt unit coupled with the CPU, wherein the context switch may be induced by an interrupt. According to a further embodiment, the context switch may be software induced. According to a further embodiment, the content of the status register, the bank select register, the plurality of indirect memory address registers, the working register, and the program counter high latch may be saved to a plurality of additional registers. According to a further embodiment, the content of the status register, the bank select register, the plurality of indirect memory address registers, the working register, and the program counter high latch may be saved to a stack or additional memory. According to a further embodiment, each memory bank may have the following special function registers memory mapped: —a plurality of indirect addressing mode registers which cause an indirect addressing access upon a read or write access to the first and second indirect addressing mode registers; —a first program counter register; —a status register, —a plurality of indirect memory address registers; —a bank select register, —a working register, —a program counter high latch register, and—an interrupt control register. According to a further embodiment, the special function registers can be mapped starting at memory bank address 0. According to a further embodiment, the device may comprise 2 indirect addressing mode registers and 4 indirect memory address registers, wherein access to an indirect addressing mode register may use 2 concatenated indirect memory address registers of the 4 indirect memory address registers and wherein the special function registers are mapped from memory bank address 0 to 0 Bh. According to a further embodiment, the device may further comprise a program memory coupled with the CPU, wherein a bit in the indirect memory address registers indicates whether an indirect memory access is performed on the data memory or the program memory.

According to another embodiment, a method of operating a microprocessor or microcontroller device with a central processing unit (CPU); a data memory coupled with the CPU, wherein the data memory is divided into a plurality of memory banks; a plurality of special function registers and general purpose registers, may comprise the steps of: memory mapping at least the following special function registers to all memory banks: a status register, a bank select register, a plurality of indirect memory address registers, a working register, and a program counter high latch; upon occurrence of a context switch, saving automatically the content of the status register, the bank select register, the plurality of indirect memory address registers, the working register, and the program counter high latch, and upon return from the context switch restoring the content of the status register, the bank select register, the plurality of indirect memory address registers, the working register, and the program counter high latch.

According to a further embodiment, the method may further comprise inducing the context switch by an interrupt. According to a further embodiment, the context switch may be software induced. According to a further embodiment, the content of the status register, the bank select register, the plurality of indirect memory address registers, the working register, and the program counter high latch may be saved to a plurality of additional registers. According to a further embodiment, the content of the status register, the bank select register, the plurality of indirect memory address registers, the working register, and the program counter high latch may be saved to a stack or additional memory. According to a further embodiment, each memory bank may have the following special function registers memory mapped: —a plurality of indirect addressing mode registers which cause an indirect addressing access upon a read or write access to the first and second indirect addressing mode registers; —a first program counter register; —a status register, —a plurality of indirect memory address registers; —a bank select register, —a working register, —a program counter high latch register, and—an interrupt control register. According to a further embodiment, the special function registers can be mapped starting at memory bank address 0. According to a further embodiment, the method may use 2 indirect addressing mode registers and 4 indirect memory address registers, wherein access to an indirect addressing mode register uses 2 concatenated indirect memory address registers of the 4 indirect memory address registers and wherein the special function registers are mapped from memory bank address 0 to 0 Bh. According to a further embodiment, the method may further use a program memory coupled with the CPU, wherein a bit in the indirect memory address registers indicates whether an indirect memory access is performed on the data memory or the program memory.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein:

FIG. 12 is a table showing the special function register summary according to an embodiment.

FIGS. 13A and B are a table showing the instruction set of a microprocessor or microcontroller according to an embodiment.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Figure 1:
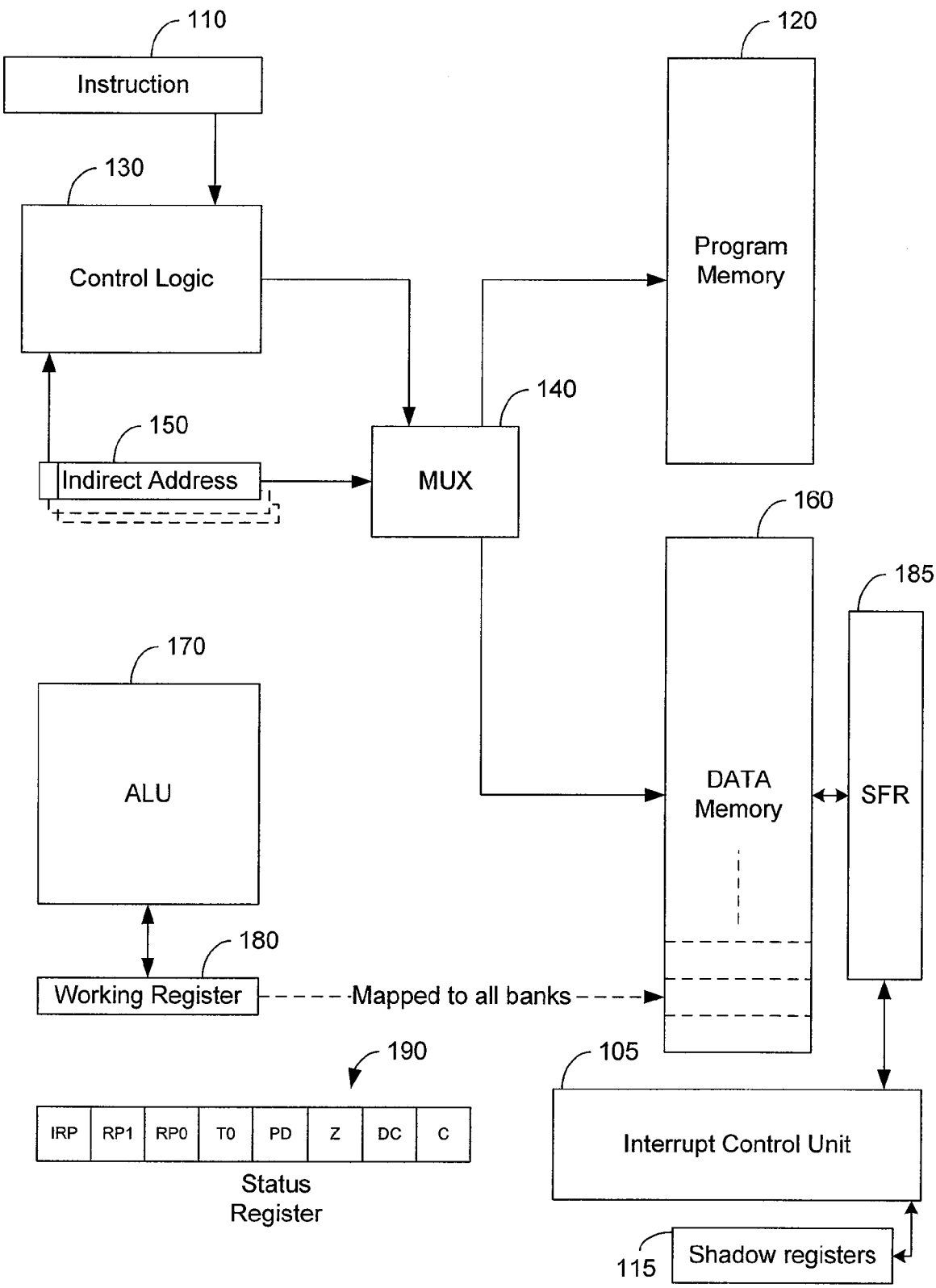
FIG. 1 shows a block diagram of microcontroller architecture according to an embodiment.

FIG. 1 shows amongst others different functional units of a central processing unit of a microprocessor or microcontroller relevant for accessing program and data memory in a Harvard-type architecture according to an embodiment. An instruction register 110 may store a fetched instruction which may be decoded by a control logic 130. A plurality of indirect addressing registers 150 may be provided each storing an address. Even though shown separately in FIG. 1, these and other special function registers are part of a special function register block 185. To perform an indirect addressing access, a read or write to a dedicated special function register in special function register block 185 is performed. In case such an indirect addressing access is executed, control logic 130 controls a multiplexer 140 which receives on the input side an address from indirect address register 150. According to an embodiment, the indirect address registers have a predefined bit, such as the most significant bit, which is decoded by control logic 130 to determine whether an indirect access to program memory 120 or to data memory 160 will be performed.

In an 8-bit architecture, the data memory is 8-bit wide. According to the Harvard architecture, the program memory is separated from the data memory and may have a different size. For example, in one embodiment, the program memory may be 14, 15 or 16 bits wide. Thus, instructions can be decoded that include for example, an 8 bit direct address. Some instruction may contain even more address bits that may be combined with another register to perform, for example, relative addressing.

The data memory 160 may be divided into a plurality of banks that can be decoded by 7 or 8 bits. Each bank can be considered as a register file. According to one embodiment, data memory contains a total of 16 banks each having 256 addressable memory locations resulting in a total memory of 4096 bytes. According to another embodiment, 16 banks with 128 addressable memory locations may be provided. Other configurations are possible according to various embodiments. The central processing unit may further include an arithmetic logic unit 170 (ALU) coupled with a working register 180. Working register 180 is one of a plurality of special function registers of block 185. As stated above, data memory 160 may be divided into a plurality of banks 1 . . . n. With the exception of certain addressing modes, instructions generally have only access to the selected memory bank. Thus, certain important special function registers from special function register block 185 are memory mapped to all memory banks 1 . . . n as indicated by the arrow between data memory 160 and special function register block 185. According to various embodiments, special function registers not mapped to all memory banks may be mapped to a single memory bank at respective different memory locations. According to various embodiments, some special function registers may not be mapped to memory at all.

Even though the mapping of certain special function registers to all memory banks limits the accessible free RAM in each memory bank, many otherwise necessary bank switch sequences can be avoided to access important special function registers. For example, a microcontroller may have 12 special function registers such as the working register 180 mapped to all memory banks. Thus, according to an embodiment, each memory bank may have 244 or 116 free memory locations depending on the size of each memory bank. Other configurations are possible according to various embodiments.

According to an embodiment, the enhanced microcontroller may contain an 8-bit ALU 170 and working register 180 (WREG). The ALU 170 may be a general purpose arithmetic unit. It performs arithmetic and Boolean functions between data in the working register 180 and any register file. The ALU 170 can be 8-bits wide and may be capable of addition, subtraction, shift, and logical operations. Unless otherwise mentioned, arithmetic operations may be two's complement in nature. WREG 180 may be an 8-bit working register used for ALU operations. The WREG register 180 is addressable and can be directly written or read. According to an embodiment, WREG 180 is one of the 12 common SFR's that are mapped to all 16 banks—its address may be for example 09 h. The Arithmetic and Logic Unit 170 may be capable of carrying out arithmetic or logical operations on two operands or a single operand. All single operand instructions operate either on the WREG register 180 or the given file register. For two operand instructions, one of the operands is the WREG register 180 and the other one is either a file register or an 8-bit immediate constant. Depending on the instruction executed, the ALU 170 may affect the values of the Carry (C), Digit Carry (DC) or Zero (Z) bits in the STATUS register 190. The C and DC bits operate as a borrow and digit borrow out bit, respectively, in subtraction. Examples affecting these status bits are such instructions as SUBLW and SUBWF as will be explained in more detail below.

The STATUS register 190, as shown in FIG. 1 may contain: Arithmetic status of the ALU such as carry/borrow, digit carry/borrow, and zero flag; RP<1:0>, representing the lower two bank select bits for direct addressing; IRP, representing the bank select register bit for indirect addressing; time out bit, and power down bit.

According to an embodiment, the enhanced microcontroller comprises a Bank Select Register (BSR), in order to maintain backwards compatibility, also bits RP<1:0> may be maintained. There may be full, bi-directional mirroring between RP<1:0> and BSR<1:0>: changing the one register, therefore, automatically changes the other. Hence, RP<1:0> and BSR<1:0> point to the same physical memory.

Even though the enhanced microcontroller contains multiple full indirect address registers 150 (file select registers (FSR's)), bit IRP may be also maintained for backwards compatability—it is a direct, bi-directional mirror of FSR0H<0>. Changing FSR0H<0>, thus, automatically changes IRP, and visa versa. IRP and FSRH0h<0> point to the same physical memory.

According to an embodiment, the STATUS register 190 is common across all banks, and can be located at 03 h. Fast context saving on interrupts, as will be explained in more detail below, is implemented for all the STATUS bits, except TO and PD. The STATUS register can be the destination for any instruction, like any other register. If the STATUS register is the destination for an instruction that affects the Z, DC or C bits, then these bits are set or cleared according to the device logic. Furthermore, the TO and PD bits are not writable. Therefore, the result of an instruction with the Status register 190 as destination may be different than intended. For example, the instruction CLRF STATUS will clear all the bits except TO and PD, and then the Z bit will automatically be set by device logic. This leaves the STATUS register 190 as '000u u100' (where u=unchanged). The C and DC bits operate as a Borrow and Digit Borrow out bit, respectively, in subtraction.

The status register 190 thus may contain the following bits:

IRP: Indirect Register Bank Select bit (For backwards compatability. Mirrors FSR0H<0>) 1=Bank 2, 3 (100 h-1 FFh); 0=Bank 0, 1 (00 h-FFh)

RP<1:0>: Register Bank Select bits (For backwards compatability. Mirrors BSR<1:0>) 00=Bank 0 (00 h-7 Fh); 01=Bank 1 (80 h-FFh); 10=Bank 2 (100 h-17 Fh); 11=Bank 3 (180 h-1 FFh)

TO: Time-out bit (Not automatically saved on interrupts) 1=After power-up, CLRWDT instruction or SLEEP instruction; 0=A watch dog timer time-out occurred;

PD: Power-down bit (Not automatically saved on interrupts) 1=After power-up or by the CLRWDT instruction; 0=By execution of the SLEEP instruction Z: Zero bit: 1=The result of an arithmetic or logic operation is zero; 0=The result of an arithmetic or logic operation is not zero.

DC: Digit Carry/Borrow bit (ADDWF, ADDLW, SUBLW, SUBWF instructions): 1=A carry-out from the 4th low-order bit of the result occurred; 0=No carry-out from the 4th low-order bit of the result.

C: Carry/Borrow bit (ADDWF, ADDLW, SUBLW, SUBWF instructions): 1=A carry-out from the Most Significant bit of the result occurred; 0=No carry-out from the Most Significant bit of the result occurred.

For Borrow, the polarity can be reversed. A subtraction is executed by adding the two's complement of the second operand. For rotate (RRF, RLF) instructions, this bit is loaded with either the high or low-order bit of the source register.

The enhanced microcontroller core can directly or indirectly address its register files (banks) or data memory. According to an embodiment, all special function registers, including the Program Counter (PC) and Working Register (WREG), are mapped in the data memory. The enhanced microcontroller core has an orthogonal (symmetrical) instruction set that makes it possible to carry out any operation on any register using any addressing mode. This symmetrical nature and lack of 'special optimal situations' make programming with the enhanced microcontroller core simple yet efficient. In addition, the learning curve for a user is reduced significantly.

According to an embodiment, the following blocks may be realized in the core: Program counter; Instruction decode; ALU; read only memory (ROM) Latch/IR Latch; FSRs and address generation logic; Working Register; WREG; Status bits in STATUS; Interrupt vectoring control with fast context saving; The bank select register BSR.

The following blocks may not be considered part of the CPU: The stack; Reset generation circuitry (watch dog timer (WDT), power on reset (POR), brown out reset (BOR), etc.); Program Memory; Peripherals; RAM; RAM Address Control; Q-clock generator and control; Interrupt Enable and Flagging; interrupt control registers; Configuration bits; Device ID word; ID locations; Clock drivers.

As stated above, according to an embodiment, the following registers may be common across all 16 banks: INDF0 (Used for indirect addressing and may not be a physical register); INDF1 (Used for indirect addressing and may not be a physical register); PCL (PC LSB); STATUS; FSR0L (Indirect memory address 0, LSB); FSR0H (Indirect memory address 0, MSB); FSR1L (Indirect memory address 1, LSB); FSR1H (Indirect memory address 1, MSB); WREG, the working register; BSR (Bank select register); PCLATH (Write buffer for program counter PC<14:8>); interrupt control register INTCON.

According to an embodiment, the microprocessor or microcontroller may further comprise an interrupt control unit 105 which may be coupled with certain special function registers 115. Upon occurrence of an interrupt or any other induced context switch, such as software traps, the contents of the following registers selected from the special function registers mapped to all memory banks are automatically saved. STATUS (except for TO and PD); BSR, PCLATH, WREG, FSR0 (Both FSR0H and FSR0L), and FSR1 (Both FSR1H and FSR1L). The registers are automatically restored to their pre-interrupt values upon a return from interrupt.

To this end, as shown in FIG. 1, the microprocessor or microcontroller core may have at least one additional set of registers 115 which will store the content of the above mentioned registers. However, according to other embodiments, a stack, additional data memory, etc. may be provided to store the content of these registers upon a context switch.

Figure 2:
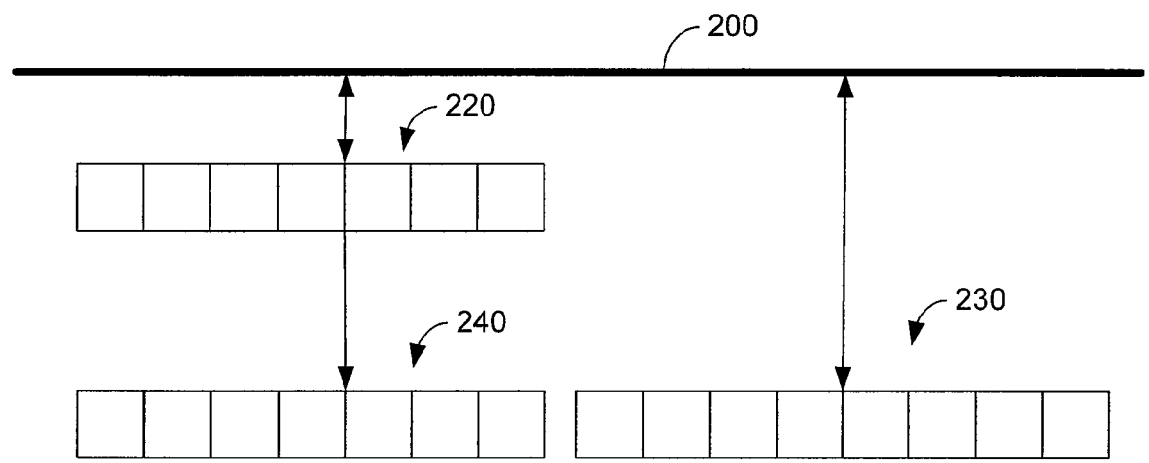
FIG. 2 shows an embodiment of a program counter and its coupling to an internal bus.

As shown in FIG. 2, the program counter PC consists of two concatenated 8 bit registers PCL 230 and PCH 240. It addresses words in program memory, and according to an embodiment, is e.g. 15 bits wide. Thus, it can be used to address up to 32 kW. PCL 230, the low byte of the PC, is mapped in the data memory 160. Thus, it is common across all banks, and located for example at address 02h. PCL 240 is readable and writable just as any other register. Any time that PCL 230 is modified by an instruction, whether a write to PCL 230 or a read-modify-write, the CPU may need to execute a forced NOP in order to retrieve the instruction at the new address. PCH 240 is the high byte of the PC and is not directly addressable. Since PCH may not be mapped in data or program memory, register PCLATH 220 (PC high latch) is used as holding latches for the high bits of the PC (PCH<6:0>). According to an embodiment, PCLATH 220 is mapped into data memory. Thus, it is common across all banks, and can be located at address 0Ah. PCLATH 220 is only updated by explicit loading of the register. Therefore according to an embodiment no other instructions update it. The enhanced microcontroller may be designed that updating PCLATH 220 does not automatically update PCH 240. PCH 240 is only updated with the content of PCLATH 220 on GOTO, CALL and CALLW instructions. The PC is incremented by 1 after each instruction fetch on the rising edge of Q1 unless: Modified by a GOTO, CALL, RETURN, RETLW, RETFIE, or Branch instruction; Modified by an interrupt response; Due to destination write to PCL by an instruction.

"Skips" are equivalent to a forced NOP cycle at the skipped address. As shown in FIG. 2, the operations of the PC 230, 240 and PCLATH 220, for different instructions are as follows:

Read instructions on PCL 230: PCL 230 → data bus 200 → ALU 170 or destination.

Write instructions on PCL 230: 8-bit data → data bus 200 → PCL 230.

Read-Modify-Write instructions on PCL 230: Any instruction that does a read-write-modify operation on PCL 230. Read: PCL 230 → data bus 200 → ALU 170; Write: 8-bit result → data bus → PCL 230.

RETURN instruction: TOS → PC <14:0>230, 240.

Figure 3:
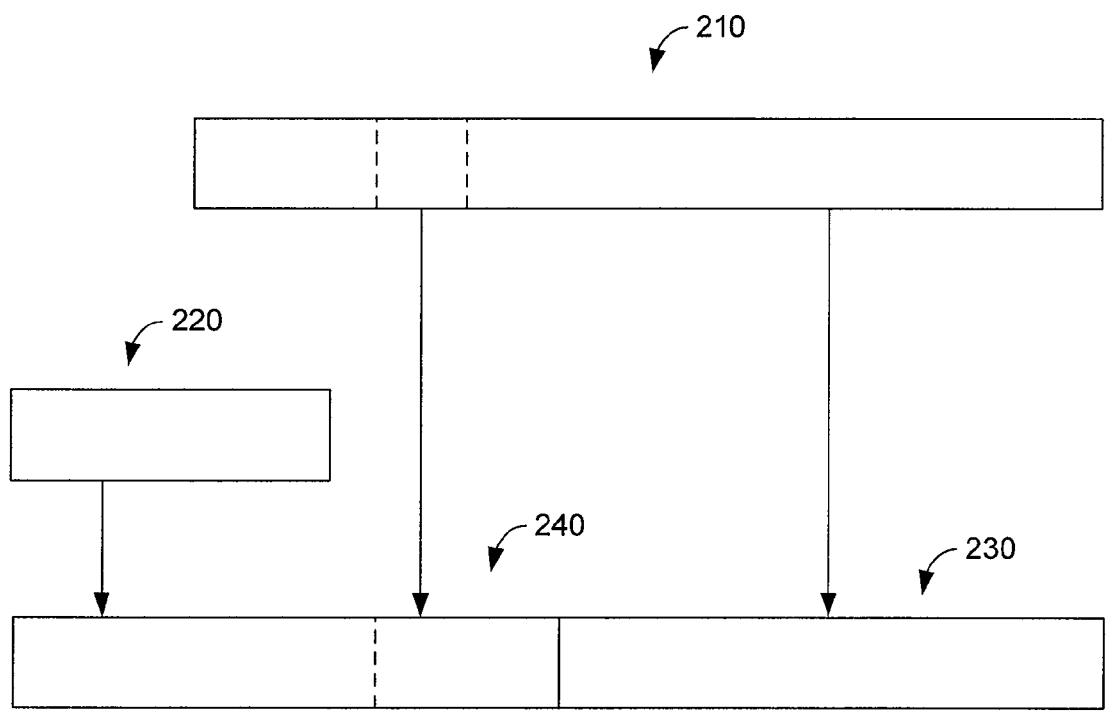
FIGS. 3-6 show different operations on the program counter depending on the instruction being executed.

FIG. 3 shows in addition a fetched instruction 210 and its effect on the program counter 230, 240. FIG. 3 applies to the following instructions:

GOTO instruction: A destination address is provided in the 2-word instruction (opcode) 210. Opcode <7:0> → PCL<7:0>230; Opcode<10:8> → PCH<2:0>240; PCLATH<6:3>220 → PCH<6:3>240.

CALL instruction: An 11-bit destination address is provided in the instruction 210. Push the current address (PC+1) to the stack. Opcode <7:0> → PCL <7:0>230; Opcode <10:8> → PCH <2:0>240; PCLATH <6:3> 220 → PCH <6:3>240.

Figure 4:
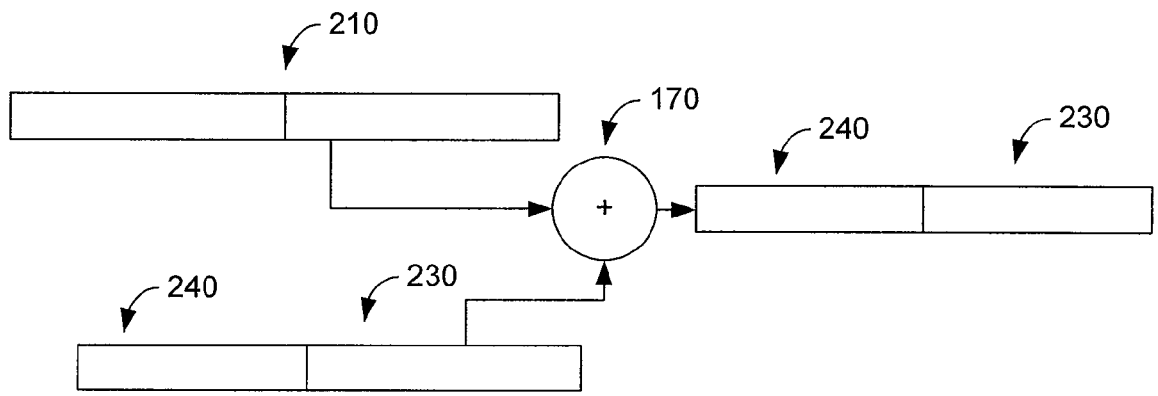

FIG. 4 shows the configuration for the following instructions:

BRA instruction: A 9-bit, signed, offset is provided in the instruction 210. Opcode <8:0>+PC (+1)→PC.

Figure 5:
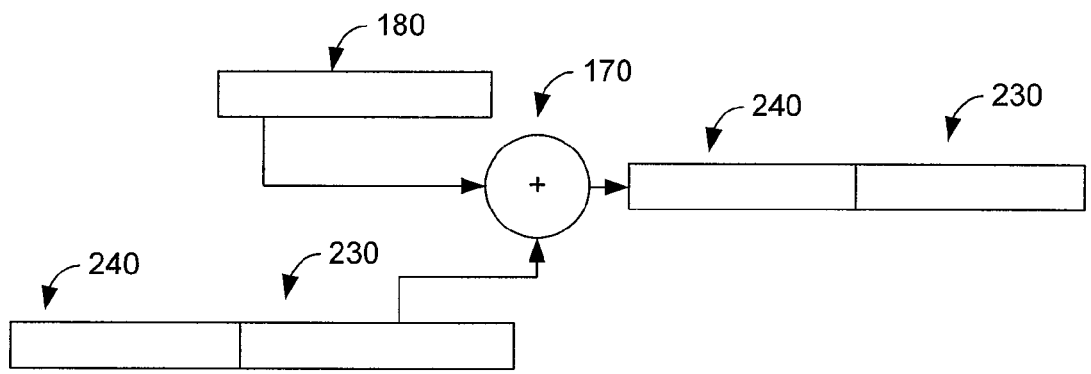

FIG. 5 shows the configuration for the following instructions:

BRW instruction: An 8-bit unsigned, offset provided in WREG 180. PC (+1)+WREG → PC.

Figure 6:
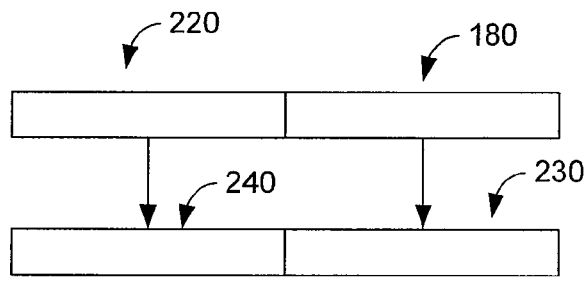

FIG. 6 shows the configuration for the following instructions:

CALLW instruction: An 8-bit destination address is provided in WREG 180. Push the current address (PC+1) to the stack. WREG <7:0> → PCL <7:0>; PCLATH <6:0> → PCH <6:0>.

To enable a test memory area, the program counter 230, 240 may have a hidden 16th bit, PC<15>. When PC<15> is set the instructions will be fetched from a test area. In user mode, PC<15> is always 0, and cannot be modified in software. In test mode, PC<15> defaults to 0, but can be set by a "load configuration" command. It can be cleared by a "Reset PC" command. The test memory access may behave with an in circuit debugger (ICD) as follows:

ICD_v1: PC<15> is forced high to fetch the ICD vector, but returns to 0 after the first instruction (GOTO ICD_ROUTINE) is executed. From then until exiting the debug exec, PC<14:11> is forced to '1111 b', but PCLATH is not affected.

ICD_v2: If the ICD debug exec is in user memory, then it follows ICD_V1. If the debug exec is in test memory, then PC<15> is forced high to fetch the ICD vector, and returns to zero on icd_return.

Figure 7:
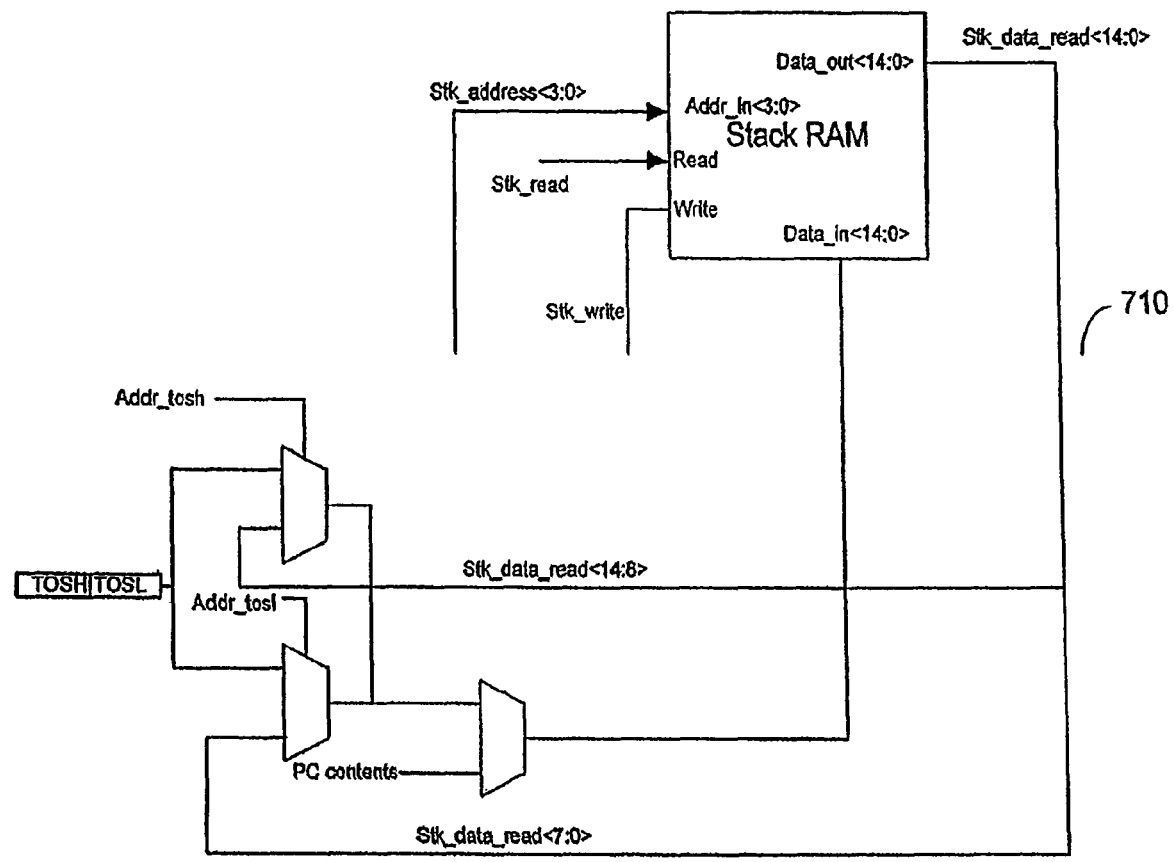
FIG. 7 shows an embodiment of a stack and control logic.

The enhanced microcontroller devices according to various embodiments may support a stack memory 15 bits wide and 16 bits deep as shown in FIG. 7. During normal operation, the stack 710 is assumed to be 16 words deep. In normal mode, no direct user access is provided to the stack 710. The stack is not part of either the program or data memory space. The full PC (Program Counter) is pushed onto the stack when a CALL or CALLW instruction is executed, or an interrupt request is acknowledged. The PC value is pulled off the stack on a RETURN, RETLW, or RETFIE, instruction. PCLATH is not affected by any of the CALL or RETURN type instructions.

The stack 710 operates as a 16 word by 15-bit RAM and a 4-bit stack pointer. Incrementing/decrementing the pointer past 1111b/0000b will cause it to wrap around to 0000b/1111b. During a CALL type instruction, the stack pointer is incremented and the contents of the PC are loaded to the stack 710. During a RETURN type instruction the contents pointed to are transferred to the PC and then the stack pointer is decremented. The stack pointer is initialized to '1111b' after all Resets. The first call will cause the pointer to wrap to 0000b.

A stack overflow/underflow event occurs when the stack pointer is incremented/decremented past 1111 b/0000 b AND a data transfer to/from the stack is conducted at the new address. An overflow event must not occur on the first CALL. On the 16th consecutive call, the stack pointer will have a value of 1111 b. The 17th consecutive CALL will cause the stack pointer to wrap around to 0000 b, and the PC to be loaded at this position. This constitutes an overflow event. When the stack has been popped enough times to reach 0000 b, further popping will cause the contents at 0000 b to be transferred to the PC, and the stack pointer to be decremented. The stack pointer will wrap to 1111 b, this DOES NOT constitute an underflow event. Only on the next consecutive pop, when data transfer from 1111 b is attempted, will an underflow event occur. In user mode, a stack overflow or underflow will set the appropriate bit (STOF or STUF) in the PCON register, and cause a software reset.

When in ICD mode, the stack may have two segments. The normal user mode stack is still 16 words deep, but a separate ICD stack may also be provided. In ICD mode it will be possible to access the top of the stack and the stack pointer. In ICD mode, the top of the stack (TOS) is readable and writable. Two register locations, TOSH and TOSL, will address the stack RAM location pointed to by the stack pointer (STKPTR). After a CALL type instruction, the software can read the pushed value by reading the TOSH and TOSL registers. These values can be placed on a user defined software stack. Writing to the TOS registers will cause the PC to be updated with the new value on the next RETURN type instruction.

The STKPTR register contains the stack pointer value. As previously noted, STKPTR is accessible in ICD mode only. In ICD mode, the stack pointer can be accessed through the STKPTR register. The user may read and write the stack pointer values. The stack pointer is initialized to '1111 b' after all Resets. In ICD mode, an automatic software reset will not be applied on an overflow/underflow event. However, the stack overflow (STOF) or underflow (STUF) bit in the PCON register will still be set, allowing software verification of a stack condition. Because a reset will not be executed on an underflow/overflow, the stack pointer (STKPTR) will not be reset. On an overflow/underflow the stack pointer will wrap around and then resume normal operation. The user has to clear the overflow (STOF) or underflow (STUF) bits explicitly—and they will again be automatically set on subsequent overflows/underflows. Stack Overflow/Underflow events can only be caused by an instruction that modifies the stack pointer using the stack pointer hardware. This includes: CALL, TRAP; RETURN, RETFIE, RETLW; Any interrupt and ICD traps. Instructions that modify the stack pointer through the ALU (ICD mode only) will not cause the stack underflow/overflow condition, and thus will not set the (STOF) or (STUF) bits. Examples are (ICD mode only): INCF STKPTR; DECF STKPTR; ADDWF STKPTR.

When a device is reset, the PC is loaded with the Reset vector (0 h). The stack pointer is initialized to '1111 b', and the Top of Stack register (TOS) is '0000 h'. A second push increments the stack pointer and then loads the current PC into stack level. On the 16th consecutive call, the stack pointer will have a value of 1111 b. The 17th consecutive CALL will cause the stack pointer to wrap around to 0000 b, and the PC to be loaded at this position. This constitutes an overflow event. A RETURN pop will copy the stack contents pointed to the PC and then decrement the stack pointer. When the stack has been popped enough times to reach 0000 b, further popping will cause the contents at 0000 b to be transferred to the PC, and the stack pointer to be decremented. The stack pointer will wrap to 1111 b, this DOES NOT constitute an underflow event. Only on the next consecutive pop, when data transfer from 1111 b is attempted, will an underflow event occur. In debug (ICD) mode a special instruction will cause the STKPTR to be incremented. The PC is not loaded to TOS. It is up to the user to make sure TOS is loaded with the appropriate data before executing the INCF STKPTR instruction (this instruction is thus equivalent to a PUSH instruction. The DECF STKPTR instruction will decrement the stack pointer, the PC is not loaded with the TOS value.

Figure 8:
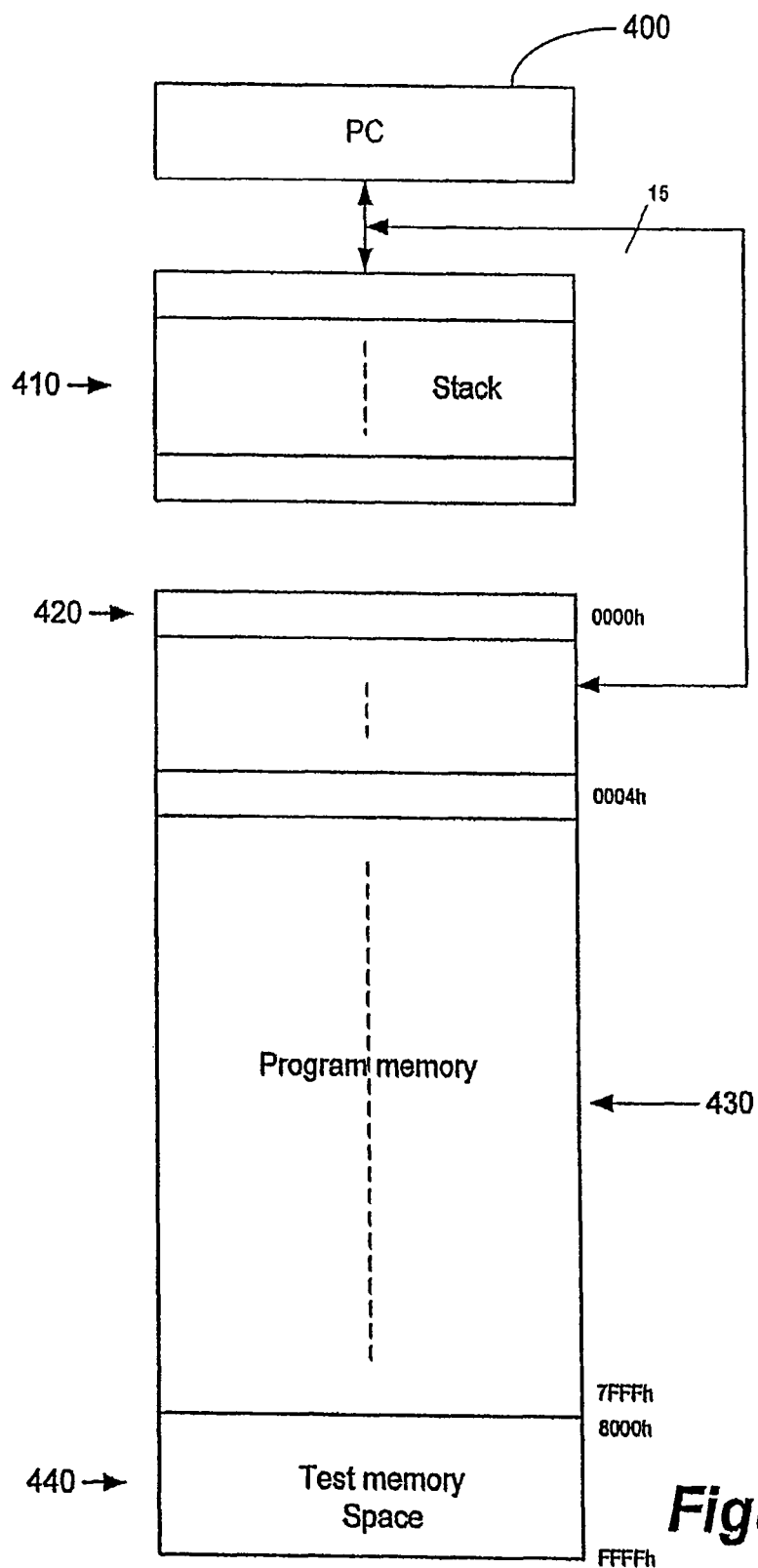
FIG. 8 shows an embodiment of a program memory map and stack.

As shown in FIG. 8, the 15-bit program counter 400 is capable of addressing a 32k×14 bit program memory space 420 and its content can be saved in a stack 410. The program memory space 430 primarily contains instructions for execution; however, data tables may be stored and accessed as well (using legacy program memory read/write infrastructure, as well as the new functionality associated with indirect addressing, see the FSR section for more detail). There is also a 16th PC bit hidden during normal operation, and when set, it is possible to address another 32k×14 of memory reserved for configuration bits, the device ID, and test memory 440. This bit is only set in test mode or programming mode. As shown in FIG. 8, the Reset vector is at '0000h' and the interrupt vector is at '0004h'.

Figure 9:
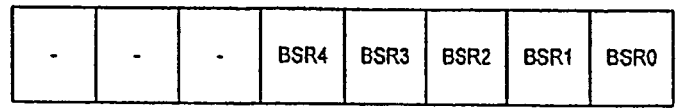
FIG. 9 shows an embodiment of a bank select register.
Figure 10:
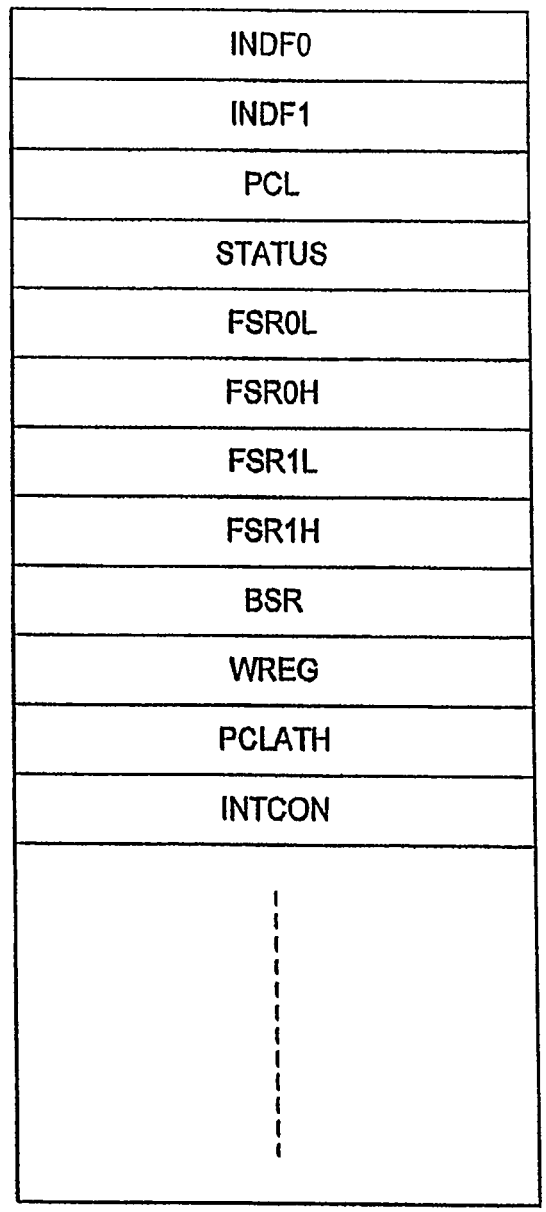
FIG. 10 shows an embodiment of the structure of a memory bank in the data memory.

According to one embodiment, the enhanced microcontroller can address data memory 160 and general purpose RAM of up to 2048 bytes. The data memory address bus is 11 bits wide. Data memory is partitioned into 16 banks of 128 bytes each that contain the General Purpose Registers (GPRs) and Special Function Registers (SFRs). The bank is selected by the bank select register (BSR<3:0>) as shown in FIG. 9. The BSR register can access more than 16 banks; however, this may be only allowed in ICD mode to allow for a larger data space for the ICD registers. (In ICD mode 32 banks can be accessed). The bits BSR0 and BSR1 are also mapped into the STATUS register as RP0 and RP1 respectively. This is to allow for backward compatibility with existing devices. A read or write to BSR0/1 will affect RP0/1 and vice versa. FIG. 10 shows an example data memory map.

When the core is operating with an ICD module or in another embodiment, the total number of banks may be expanded to 32 for 4096 total addresses. This is to allow the ICD registers to be mapped into the data space and not use any of the user memory map. This will only be enabled when the ICD module is enabled. The user will have no access to any bank greater than Bank15. Other configurations are possible according to various embodiments.

Figure 11:
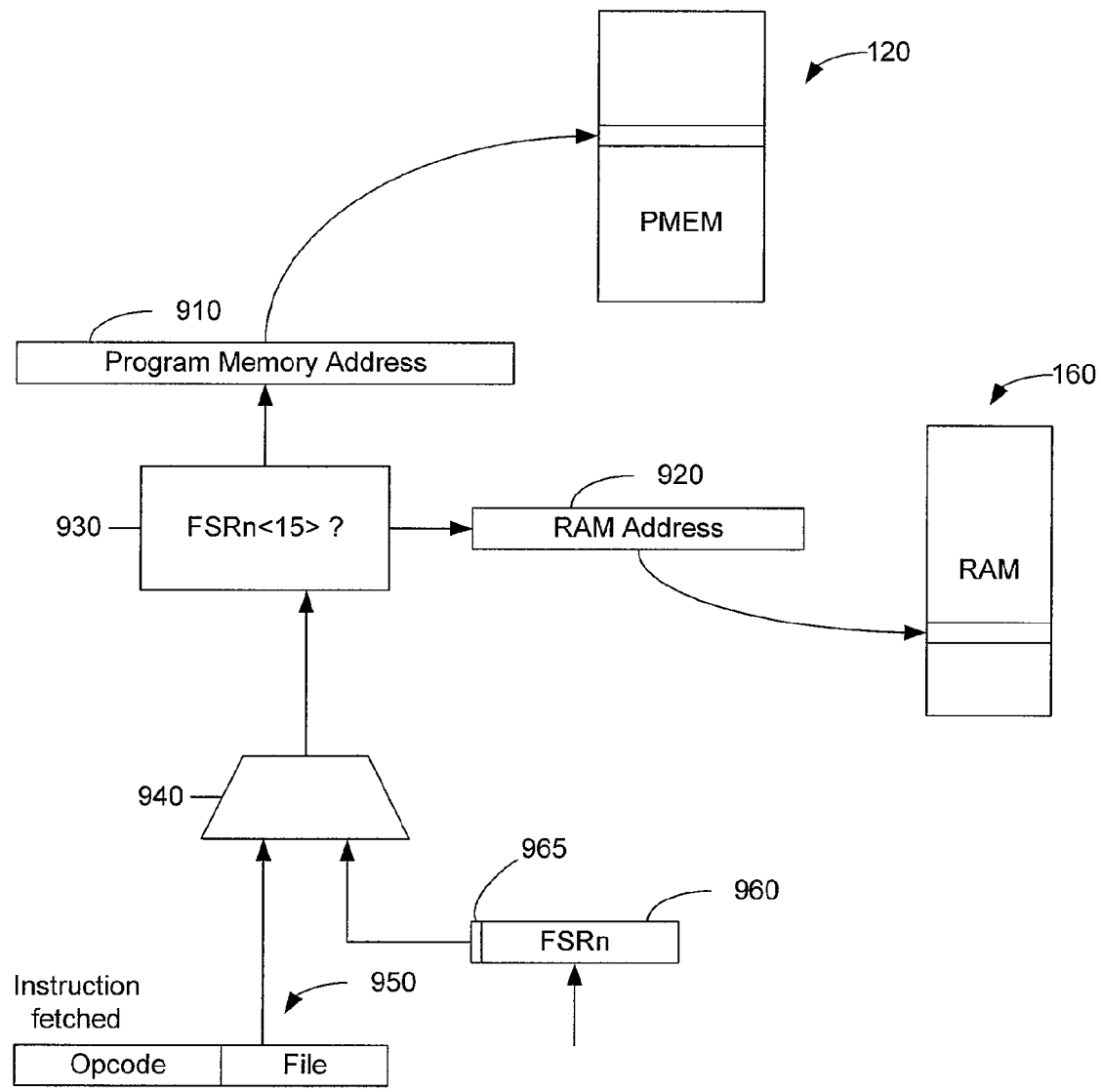
FIG. 11 shows an access scheme for indirect memory access.

FIG. 11 shows an embodiment of indirect addressing scheme which is a mode of addressing data memory where the data memory address in the instruction is determined by another register. This can be useful for data tables or stacks in the data/program memory. The value of the file select register (FSR) register 960 is used as the data memory address. The enhanced microcontroller has two 16-bit register pairs 960 for indirect addressing. These so called file select register pairs are: FSR0H and FSR0L; and FSR1H and FSR1L. The FSRs 960 are 16-bit registers and thus allow addressing of up to 65,536 locations. A single bit 965 in these file select registers 960 can be used to determine whether an access to data memory 160 or program memory 120 will be performed. To this end, logic unit 930 forwards the content of file select register 960 to either program memory address 910 or RAM address 920 for accessing the respective memories.

Non-indirect addressing uses the respective content "File" of a fetched instruction 950 through multiplexer 940. Bank access are then performed through RAM address 920 wherein the bank address is provided by the respective bank access register to form a full address 920. As shown in FIG. 11, file select registers 960 are provided for indirect addressing. For indirect addressing, the output of multiplexer 940 provides the "File" address through the content of the respective file select register 960. If indirect addressing is selected, bit 15 indicated by numeral 965 of each file select register 960 is used to determine whether an access to program memory 120 through program memory address 910 or to data memory 160 through data address 920 will be performed. Indirect addressing is initiated through a respective select signal (not shown) controlling multiplexer 940.

When FSRn<15> equals 0, data memory 160 is addressed. When FSRn<15> is 1, program memory 120 is addressed. The data memory 160 is mapped into the first half of this address space (0000 h to 7 FFFh). If FSRn<15> is 0, FSRn<10:0> points to data memory locations 000 h to 7 FFh. In this case FSRn<11:14> is ignored. The program memory 120 is mapped into the upper half of this address space (8000 h to FFFFh). If FSRn<15> is 1, then FSRn<14:0> points to program memory addresses 0000 h to 7 FFFh. In summary: Addresses 8000 h and higher point to program memory. Addresses below 8000 h point to data memory, with only the lower 11 bits used for address decoding.

In addition, there are virtual registers INDF0 and INDF1 (See FIG. 10), which are not physically implemented. Reading or writing to these registers activates indirect addressing, with the value in the corresponding FSR register being the address of the data. If file INDF0 (or INDF1) itself is read indirectly via an FSR, all '0's are read (Zero bit is set). Similarly, if INDF0 (or INDF1) is written to indirectly, the operation will be equivalent to a NOP, and the STATUS bits are not affected. Indirect writes to program memory space (FSRn<15>=1) will have no effect, and will lead to the equivalent of a NOP being executed. Indirect reads from program memory space (FSRn<15>=1) will cause the first 8 bits of the program memory location to be transferred to the destination register, the EEDATH/PMDATH will be updated with the upper 6 bits. According to various embodiments, other mechanism may be implemented to induce indirect addressing.

FIG. 12 shows a summary of all special function registers according to an embodiment as used in any bank n of the data memory.

FIGS. 13A and B show the instruction set wherein the enhanced instructions using the architecture as explained above are explained in detail below.

---

ADDFSR Add Literal to FSRn: Syntax: ADDFSR n, k

---

Operands: $-32 \leq k \leq 31$
$n \in [0, 1]$
Operation: FSR(n) + k → FSR(n)
Status Affected: None
Encoding: 11 0001 0nkk kkkk
Description: The signed 6-bit literal 'k' is added to the contents of the FSR specified by 'n'. FSRn is limited to the range 0000h-FFFFh. Incrementing/decrementing it beyond these bounds will cause it to wrap around. Note that addresses 8000h and larger point to program memory. Addresses below 8000h point to data memory, with only the lower 11 bits used for address decoding.
Words: 1
Cycles: 1
Q Cycle Activity:
Q1         Q2            Q3             Q4
Decode    Read FSRn'   Process Data   Write to FSRn
Example: ADDFSR 1, 23h
    Before Instruction FSR1 = 0FFh
    After Instruction FSR1 = 0122h

---

ADDWFC ADD WREG and CARRY bit to f: Syntax: ADDWFC f {,d}

---

Operands: $0 \leq f \leq 127$
$d \in [0, 1]$
Operation: (WREG) + (f) + (C) → dest
Status Affected: C, DC, Z
Encoding: 11 1101 dfff ffff
Description: Add WREG, the CARRY flag and data memory location 'f'. If 'd' is '0', the result is placed in WREG. If 'd' is '1', the result is placed in data memory location 'f'.
Cycles: 1
Q Cycle Activity:
Q1         Q2           Q3             Q4
Decode    Read reg 'f'  Process Data  Write to destination
Example: ADDWFC REG, 0
    Before Instruction  CARRY bit=1
                            REG = 02h
                            WREG = 4Dh
    After Instruction   CARRY bit=0
                            REG = 02h
                            WREG = 50h

---

ASRF Arithmetic Right Shift: Syntax: ASRF f {,d}

---

Operands: $0 \leq f \leq 127$
$d \in [0, 1]$
Operation: (f<7>) → dest<7>
           (f<7:1>) → dest<6:0>,
           (f<0>) → C,
Status Affected: C, Z
Encoding: 11 0111 dfff ffff
Description: The contents of register 'f' are shifted one bit to the right through the CARRY flag. The MSb remains unchanged. If 'd' is '0', the result is placed in WREG. If 'd' is '1', the result is stored back in register 'f'.
Words: 1
Cycles: 1
Q Cycle Activity:
Q1         Q2            Q3             Q4
Decode    Read reg 'f'  Process Data   Write to destination
Example: ASRF REG, 0
    Before Instruction   REG = 1110 0110
                               C = 1
    After Instruction    REG = 1110 0110
                               WREG = 1111 0011
                               C = 0

---

BRA Relative Branch: Syntax: BRA k

---

Operands: $-256 \leq k \leq 255$
Operation: (PC) + k → PC
Status Affected: None
Encoding: 11 001k kkkk kkkk
Description: Add the 2's complement number 'k' to the PC. Since the PC will have incremented to fetch the next instruction, the new address will be PC + 1 + k. This instruction is a two-cycle instruction.
Words: 1
Cycles: 2
Q Cycle Activity:
Q1         Q2            Q3             Q4
Decode    Read literal 'k'  Process Data   Write to PC
No operation  No operation   No operation   No operation
Example: 0023h BRA 005h
    Before Instruction  PC = address(0023h)
    After Instruction   PC = address(0029h)

---

BRW Relative Branch with WREG: Syntax: BRW

---

Operands: None
Operation: (PC) + (WREG) → PC
Status Affected: None
Encoding: 00 0000 0000 1011
Description: Add the contents of WREG (unsigned) to the PC. Since the PC will have incremented to fetch the next instruction, the new address will be PC + 1 + (WREG). This instruction is a two-cycle instruction. The contents of WREG is treated as an unsigned number.
Words: 1
Cycles: 2
Q Cycle Activity:
Q1         Q2            Q3             Q4
Decode    Read reg WREG  Process Data   Write to PC
No operation  No operation   No operation   No operation
Example: 0024h BRW
    Before Instruction  PC = address(0024h)
                             WREG = 85h
    After Instruction   PC = address(00AAh)

| CALLW Subroutine Call With WREG: Syntax: CALLW |
| --- |
| Operands: None
Operation: (PC) + 1 → TOS,
(WREG) → PC<7:0>,
(PCLATH<6:0>) → PC<14:8>
Status Affected: None
Encoding: 00 0000 0000 1010
Description: Subroutine call with WREG. First, the return address (PC + 1) is pushed onto the return stack. Then, the contents of WREG is loaded into PC<7:0>, and the contents of PCLATH into PC<14:8>. CALLW is a two-cycle instruction.
Words: 1
Cycles: 2
Q Cycle Activity:
Q1　　　　　　Q2　　　　　　　　　Q3　　　　　　　Q4
Decode　　　　Read register WREG　Process Data　　Write to PC
No operation　No operation　　　　No operation　　No operation
Example: 0025h CALLW
　　Before Instruction　PC = address (0025h)
　　　　　　　　　　　　WREG = 1Ah
　　　　　　　　　　　　PCLATH = 10h
　　After Instruction　 TOS = address (0026h)
　　　　　　　　　　　　PC = 101Ah
　　　　　　　　　　　　WREG = 1Ah
　　　　　　　　　　　　PCLATH = 10h |

| LSLF Logical Left Shift: Syntax: LSLF f {,d} |
| --- |
| Operands: $0 \leq f \leq 127$
　　　　　　$d \in [0, 1]$
Operation: (f<7>) → C
　　　　　　(f<6:0>) → dest<7:1>
　　　　　　0 → dest<0>
Status Affected: C, Z
Encoding: 11 0101 dfff ffff
Description: The contents of register 'f' are shifted one bit to the left through the CARRY flag. A '0' is shifted into the LSb. If 'd' is '0', the result is placed in WREG. If 'd' is '1', the result is stored back in register 'f'.
Words: 1
Cycles: 1
Q Cycle Activity:
Q1　　　　　Q2　　　　　　　　Q3　　　　　　　Q4
Decode　　　Read reg 'f'　　　Process Data　　Write to destination
Example: LSLF REG, 0
　　Before Instruction　REG = 1110 0110
　　　　　　　　　　　　C = 0
　　After Instruction　 REG = 1110 0110
　　　　　　　　　　　　WREG = 1100 1100
　　　　　　　　　　　　C = 1 |

| LSRF Logical Right Shift: Syntax: LSRF f {,d} |
| --- |
| Operands: $0 \leq f \leq 127$
　　　　　　$d \in [0, 1]$
Operation: 0 → dest<7>
　　　　　　(f<7:1>) → dest<6:0>,
　　　　　　(f<0>) → C,
Status Affected: C, Z
Encoding: 11 0110 dfff ffff
Description: The contents of register 'f' are shifted one bit to the right through the CARRY flag. A '0' is shifted into the MSb. If 'd' is '0', the result is placed in WREG. If 'd' is '1', the result is stored back in register 'f'.
Words: 1
Cycles: 1
Q Cycle Activity:
Q1　　　　　Q2　　　　　　　　Q3　　　　　　　Q4
Decode　　　Read register 'f'　Process Data　　Write to destination |

| LSRF Logical Right Shift: Syntax: LSRF f {,d} |
| --- |
| Example: LSRF REG, 0
　　Before Instruction　REG = 1110 0110
　　　　　　　　　　　　C = 1
　　After Instruction　 REG = 1110 0110
　　　　　　　　　　　　WREG = 0111 0011
　　　　　　　　　　　　C = 0 |

| MOVIW Move INDFn to WREG, with pre/post increment/decrement |
| --- |
| Syntax: MOVIW ++/−−FSRn++/−−
Operands: $n \in [0, 1]$
Operation: INDFn → WREG
Apply pre/post increment/decrement operation to FSRn.
Status Affected: Z (Only if destination is WREG)
Encoding: 00 0000 0001 0nmm
MM　Operation
00　　++FSRn
01　　−−FSRn
10　　FSRn++
11　　FSRn−−
Description: This instruction is used to move data between one of the indirect registers (INDFn) and WREG. Before/after this move, the pointer (FSRn) is updated by pre/post incrementing/decrementing it. FSRn is limited to the range 0000h - FFFFh. Incrementing/decrementing it beyond these bounds will cause it to wrap around. Note that addresses larger than 7FFFh point to program memory. Addresses below 8000h point to data memory, with only the lower 11 bits used for address decoding. The increment/decrement operation on FSRn WILL NOT affect any STATUS bits. This instruction can only affect the Z flag if a value of 00h is moved to WREG.
Words: 1
Cycles: 1
Q Cycle Activity:
Q1　　　　Q2　　　　　　　　　　Q3　　　　　　　Q4
Decode　　Update pointer if　　　Process Data　　Write to
　　　　　Read Source register.　　　　　　　　　Destination
　　　　　　　　　　　　　　　　　　　　　　　　register. Update
　　　　　　　　　　　　　　　　　　　　　　　　pointer if needed.
Example: MOVIW FSR0++
　　Before Instruction　FSR0 = 22h
　　　　　　　　　　　　WREG = FFh
　　　　　　　　　　　　(22h) = 12h
　　　　　　　　　　　　(23h) = 33h
　　After Instruction　 FSR0 = 23h
　　　　　　　　　　　　WREG = 12h
　　　　　　　　　　　　(22h) = 12h
　　　　　　　　　　　　(23h) = 33h
Example: MOVIW ++FSR0
　　Before Instruction　FSR0 = 22h
　　　　　　　　　　　　WREG = FFh
　　　　　　　　　　　　(22h) = 12h
　　　　　　　　　　　　(23h) = 33h
　　After Instruction　 FSR0 = 23h
　　　　　　　　　　　　WREG = 33h
　　　　　　　　　　　　(22h) = 12h
　　　　　　　　　　　　(23h) = 33h |

| MOVIW Move INDFn to WREG, Indexed Indirect Addressing |
| --- |
| Syntax: MOVIW [k]FSRn
Operands: $-32 \leq k \leq 31$
　　　　　　$n \in [0, 1]$
Operation: (FSRn + k) → WREG
Move data between location pointed to by FSRn + k and WREG.
Status Affected: Z (Only if destination is WREG)
Encoding: 11 1111 0nkk kkkk
Description: This instruction is used to move data between a location pointed to by FSRn + k and WREG. FSRn is NOT updated with k. |

MOVIW Move INDFn to WREG, Indexed Indirect Addressing

The addressable range is limited to 0000h-FFFFh. Indexing beyond these bounds will cause an address wrap-around. Note that addresses 8000h and higher point to program memory. Addresses below 8000h point to data memory, with only the lower 11 bits used for address decoding. Address calculation (addition of k to FSRn) WILL NOT affect any STATUS bits. This instruction can only affect the Z flag if a value of 00h is moved to WREG.
Words: 1
Cycles: 1
Q Cycle Activity:

| Q1 | Q2 | Q3 | Q4 |
|---|---|---|---|
| Decode | Address Calculation. Read Source register. | Process Data | Write to Destination register. |

Example: MOVIW [5]FSR0
    Before Instruction  FSR0 = 22h
                             WREG = FFh
                             (22h) = 12h
                             (27h) = 39h
    After Instruction   FSR0 = 22h
                             WREG = 39h
                             (22h) = 12h
                             (27h) = 39h Example: MOVIW [−5]FSR0
    Before Instruction  FSR0 = 22h
                             WREG = FFh
                             (1Dh) = 17h
                             (22h) = 12h
    After Instruction   FSR0 = 22h
                             WREG = 17h
                             (1Dh) = 17h
                             (22h) = 12h

MOVLB Move literal to BSR: Syntax: MOVLB k

Operands: $0 \leq k \leq 15$
Operation: k → BSR
Status Affected: None
Encoding: 00 0000 0010 kkkk
Description: The four-bit literal 'k' is loaded into the Bank Select Register (BSR).
Words: 1
Cycles: 1
Q Cycle Activity:

| Q1 | Q2 | Q3 | Q4 |
|---|---|---|---|
| Decode | Read literal 'k' | Process Data | Write literal 'k' to BSR |

MOVLP Move literal to PCLATH: Syntax: MOVLP k

Operands: $0 \leq k \leq 127$
Operation: k → PCLATH
Status Affected: None
Encoding: 11 0001 1kkk kkkk
Description: The seven-bit literal 'k' is loaded into the PCLATH register.
Words: 1
Cycles: 1
Q Cycle Activity:

| Q1 | Q2 | Q3 | Q4 |
|---|---|---|---|
| Decode | Read literal 'k' | Process Data | Write literal 'k' to PCLATH |

MOVWI Indexed Indirect Move: Syntax: MOVWI [k]FSRn

Operands: $-32 \leq k \leq 31$
         $n \in [0, 1]$
Operation: WREG → (FSRn + k)
Move data between WREG and location pointed to by FSRn + k.
Status Affected: Z (Only if destination is WREG)
Encoding: 11 1111 1nkk kkkk
Description: This instruction is used to move data between WREG and the location pointed to by FSRn + k. FSRn is NOT updated with k. The addressable range is limited to 0000h-FFFFh. Indexing beyond these bounds will cause an address wrap-around. Note that addresses 8000h and higher point to program memory. Addresses below 8000h point to data memory, with only the lower 11 bits used for address decoding. Address calculation (addition of k to FSRn) WILL NOT affect any STATUS bits.
Words: 1
Cycles: 1
Q Cycle Activity:

| Q1 | Q2 | Q3 | Q4 |
|---|---|---|---|
| Decode | Address Calculation. Read Source register. | Process Data | Write to Destination register. |

Example: MOVWI [3]FSR0
    Before Instruction  FSR0 = 22h
                             WREG = FFh
                             (22h) = 12h
                             (25h) = 56h
    After Instruction   FSR0 = 22h
                             WREG = FFh
                             (22h) = 12h
                             (25h) = FFh Example: MOVWI [−1]FSR0
    Before Instruction  FSR0 = 22h
                             WREG = FFh
                             (21h) = 56h
                             (22h) = 12h
    After Instruction   FSR0 = 22h
                             WREG = FFh
                             (21h) = FFh
                             (22h) = 12h Q Cycle Activity:

| Q1 | Q2 | Q3 | Q4 |
|---|---|---|---|
| Decode | Read register 'f' | Process Data | Write to destination |

MOVWI Move WREG to INDFn, with pre/post increment/decrement

Syntax: MOVWI ++/--FSRn++/--
Operands: $n \in [0, 1]$
Operation: WREG → INDFn
Apply pre/post increment/decrement operation to FSR used.
Status Affected: Z (Only if destination is WREG)
Encoding: 00 0000 0001 1nmm

| MM | Operations |
|---|---|
| 00 | ++FSRn |
| 01 | --FSRn |
| 10 | FSRn++ |
| 11 | FSRn-- |

Description: This instruction is used to move data between WREG and one of the indirect registers (INDFn). Before/after this move, the pointer (FSRn) is updated by pre/post incrementing/decrementing it. FSRn is limited to the range 0000h - FFFFh. Incrementing/decrementing it beyond these bounds will cause it to wrap around. Note that addresses 8000h and higher point to program memory. Addresses below 8000h point to data memory, with only the lower 11 bits used for address decoding. The increment/decrement operation on FSRn WILL NOT affect any STATUS bits.
Words: 1
Cycles: 1
Q Cycle Activity:

| Q1 | Q2 | Q3 | Q4 |
|---|---|---|---|
| Decode | Update pointer if needed. | Process Data | Write to INDFn. Update pointer if needed. |

-continued

| MOVWI Move WREG to INDFn, with pre/post increment/decrement |
| --- |
| Example: MOVWI FSR0−−<br>    Before Instruction  FSR0 = 22h<br>                             WREG = FFh<br>                             (21h) = 56h<br>                             (22h) = 12h<br>    After Instruction   FSR0 = 21h<br>                             WREG = FFh<br>                             (21h) = 56h<br>                             (22h) = FFh<br>Example: MOVWI −−FSR0<br>    Before Instruction  FSR0 = 22h<br>                             WREG = FFh<br>                             (21h) = 56h<br>                             (22h) = 12h<br>    After Instruction   FSR0 = 21h<br>                             WREG = FFh<br>                             (21h) = FFh<br>                             (22h) = 12h |

| RESET Software Reset: Syntax: RESET |
| --- |
| Operands: None<br>Operation:  Execute nMCLR.  Reset all registers and flags that are affected by a MCLR Reset. Set PCON.nSWRST flag.<br>Status Affected: All<br>Encoding: 00 0000 0000 0001<br>Description: This instruction provides a way to execute a MCLR Reset by software.<br>Words: 1<br>Cycles: 1<br>Q Cycle Activity:<br>Q1        Q2           Q3              Q4<br>Decode  Start Reset  No operation  No operation<br>Example: RESET<br>       After Instruction    Registers = Reset Value<br>                                   Flags* = Reset Value |

| SUBWFB Subtract WREG from f with Borrow: Syntax: SUBWFB f {,d} |
| --- |
| Operands: $0 \leq f \leq 127$<br>              $d \in [0, 1]$<br>Operation: (f) − (WREG) − (B) → dest<br>Status Affected: C, DC, Z<br>Encoding: 11 1011 dfff ffff<br>Description: Subtract WREG and the BORROW flag (CARRY) from register 'f' (2's complement method). If 'd' is '0', the result is stored in WREG. If 'd' is '1', the result is stored back in register 'f'.<br>Words: 1<br>Cycles: 1<br>Example 1: SUBWFB REG, 1<br>    Before Instruction  REG = 19h (0001 1001)<br>                             WREG = 0Dh (0000 1101)<br>                             C = 1 (So B = 0)<br>    After Instruction   REG = 0Ch (0000 1100)<br>                             WREG = 0Dh (0000 1101)<br>                             C = 1 (No Borrow)<br>                             DC = 0 (Indicates a digit borrow)<br>Example 2: SUBWFB REG, 0<br>    Before Instruction  REG = 1Bh (0001 1011)<br>                             WREG = 1Ah (0001 1010)<br>                             C = 0 (So B = 1)<br>    After Instruction   REG = 1Bh (0001 1011)<br>                             WREG = 00h<br>                             C = 1 (No Borrow)<br>                             DC = 1 (No digit borrow)<br>                             Z = 1 Result is zero |

What is claimed is:

1. A microprocessor or microcontroller device comprising: a central processing unit (CPU); a data memory coupled with the CPU, wherein the data memory is divided into a plurality of memory banks; and a plurality of special function registers that are memory-mapped to the data memory, wherein a first set of special function registers from said plurality of memory-mapped special function registers is memory-mapped to all memory banks; and wherein upon occurrence of a context switch, the CPU is operable to automatically save the content of the first set of special function registers into a second set of special function registers from said plurality of memory-mapped special function registers and upon return from said context switch restore the content of the first set of special function registers from the second set of special function registers.

2. The device according to claim 1, further comprising an interrupt unit coupled with the CPU, wherein said context switch is induced by an interrupt.

3. The device according to claim 1, wherein said context switch is software induced.

4. The device according to claim 1, wherein the first set of special function registers comprises: a status register, a bank select register, a plurality of indirect memory address registers, a working register, and a program counter high latch.

5. The device according to claim 1, wherein the first set of special function registers comprises:
a plurality of indirect addressing mode registers which cause an indirect addressing access upon a read or write access to one of said indirect addressing mode registers;
a first program counter register;
a status register,
a plurality of indirect memory address registers;
a bank select register,
a working register,
a program counter high latch register, and
an interrupt control register.

6. The device according to claim 5, wherein said first set of special function registers is mapped starting at memory bank address 0.

7. The device according to claim 6, comprising two indirect addressing mode registers and four indirect memory address registers, wherein access to an indirect addressing mode register uses two concatenated indirect memory address registers of said four indirect memory address registers and wherein said first set of special function registers is mapped from memory bank address 0 to 0Bh.

8. The device according to claim 1, further comprising a program memory coupled with said CPU, wherein a bit in an indirect memory address register indicates whether an indirect memory access is performed on said data memory or said program memory.

9. A method of operating a microprocessor or microcontroller device comprising a central processing unit (CPU); a data memory coupled with the CPU, wherein the data memory is divided into a plurality of memory banks; a plurality of special function registers that are memory-mapped to the data memory, the method comprising the steps of:
memory-mapping a first set of special function registers from said plurality of memory-mapped special function registers to all memory banks;
upon occurrence of a context switch, saving automatically the content of the first set of special function registers into a second set of special function registers from said plurality of memory-mapped special function registers, and upon return from said context switch restoring the content of the first set of special function registers from the second set of special function registers.

10. The method according to claim 9, further comprising inducing said context switch by an interrupt.

11. The method according to claim 9, wherein said context switch is software induced.

12. The method according to claim 9, wherein the first set of special function registers comprises: a status register, a bank select register, a plurality of indirect memory address registers, a working register, and a program counter high latch.

13. The method according to claim 9, wherein the first set of special function registers comprises:
   a plurality of indirect addressing mode registers which cause an indirect addressing access upon a read or write access to one of said indirect addressing mode registers;
   a first program counter register;
   a status register,
   a plurality of indirect memory address registers;
   a bank select register,
   a working register,
   a program counter high latch register, and
   an interrupt control register.

14. The method according to claim 13, wherein said first set of special function registers is mapped starting at memory bank address 0.

15. The method according to claim 13, using two indirect addressing mode registers and four indirect memory address registers, wherein access to an indirect addressing mode register uses two concatenated indirect memory address registers of said four indirect memory address registers and wherein said first set of special function registers is mapped from memory bank address 0 to 0Bh.

16. The method according to claim 9, using a program memory coupled with said CPU, wherein a bit in an indirect memory address register indicates whether an indirect memory access is performed on said data memory or said program memory.

* * * * *